(12) United States Patent
Müller-Stach et al.

(10) Patent No.: US 8,734,743 B2
(45) Date of Patent: May 27, 2014

(54) NOX STORAGE CATALYST WITH IMPROVED HYDROCARBON CONVERSION ACTIVITY

(75) Inventors: Torsten W. Müller-Stach, Hannover (DE); Susanne Stiebels, Adenbüttel (DE); Edith Schneider, Nienburg (DE); Torsten Neubauer, Langenhagen (DE)

(73) Assignee: BASF SE, Ludwigshafen (DE)

( * ) Notice: Subject to any disclaimer, the term of this patent is extended or adjusted under 35 U.S.C. 154(b) by 258 days.

(21) Appl. No.: 13/156,982

(22) Filed: Jun. 9, 2011

(65) Prior Publication Data

US 2011/0305612 A1   Dec. 15, 2011

Related U.S. Application Data

(60) Provisional application No. 61/353,236, filed on Jun. 10, 2010.

(51) Int. Cl.
| | |
|---|---|
| *B01J 23/00* | (2006.01) |
| *B01J 21/00* | (2006.01) |
| *B01J 20/00* | (2006.01) |
| *B01J 29/00* | (2006.01) |
| *F01N 3/10* | (2006.01) |
| *B01J 8/00* | (2006.01) |
| *B01D 53/00* | (2006.01) |
| *B01D 50/00* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C01G 28/00* | (2006.01) |
| *C01G 30/00* | (2006.01) |

(52) U.S. Cl.
USPC ....... 423/213.5; 423/239.2; 60/299; 422/170; 422/177; 422/180; 502/63; 502/64; 502/65; 502/66; 502/73; 502/74; 502/87; 502/240; 502/241; 502/242; 502/243; 502/244; 502/245; 502/246; 502/247; 502/248; 502/249; 502/250; 502/251; 502/252; 502/253; 502/254; 502/255; 502/256; 502/257; 502/258; 502/259; 502/260; 502/261; 502/262; 502/263; 502/302; 502/303; 502/304; 502/326; 502/327; 502/328; 502/329; 502/330; 502/331; 502/332; 502/333; 502/334; 502/335; 502/336; 502/337; 502/338; 502/339; 502/340; 502/341; 502/342; 502/343; 502/344; 502/345; 502/346; 502/347; 502/348; 502/349; 502/350; 502/351; 502/352; 502/353; 502/354; 502/355; 502/415; 502/439; 502/527.12; 502/527.13; 502/527.18; 502/527.19

(58) Field of Classification Search
USPC ................... 502/63–66, 73, 74, 87, 240–263, 502/302–304, 326–355, 415, 439, 527.12, 502/527.13, 527.18, 527.19; 422/170, 177, 422/180; 423/213.5, 239.2; 60/299
See application file for complete search history.

(56) References Cited

U.S. PATENT DOCUMENTS

| | | | |
|---|---|---|---|
| 4,961,917 A | 10/1990 | Byrne | |
| 5,516,497 A | 5/1996 | Speronello et al. | |
| 6,413,483 B1 * | 7/2002 | Brisley et al. | 423/239.1 |
| 7,055,311 B2 * | 6/2006 | Beutel et al. | 60/285 |
| 7,189,376 B2 * | 3/2007 | Kumar et al. | 422/177 |
| 7,517,826 B2 * | 4/2009 | Fujdala et al. | 502/60 |
| 7,550,117 B2 * | 6/2009 | Alward et al. | 422/177 |
| 7,576,031 B2 * | 8/2009 | Beutel et al. | 502/339 |
| 7,674,743 B2 * | 3/2010 | Gandhi et al. | 502/302 |
| 7,799,298 B2 * | 9/2010 | Pfeifer et al. | 423/213.2 |
| 8,148,290 B2 * | 4/2012 | Mueller et al. | 502/300 |
| 8,211,392 B2 * | 7/2012 | Grubert et al. | 423/213.2 |
| 8,329,607 B2 * | 12/2012 | Kazi et al. | 502/66 |
| 2003/0103886 A1 * | 6/2003 | Dou | 423/239.1 |
| 2004/0103651 A1 * | 6/2004 | Bennett et al. | 60/286 |
| 2004/0151645 A1 | 8/2004 | Li | |
| 2004/0254061 A1 * | 12/2004 | Dou | 502/71 |
| 2005/0282701 A1 | 12/2005 | Foong et al. | |
| 2009/0313971 A1 * | 12/2009 | Mueller-Stach et al. | 60/276 |
| 2010/0180581 A1 * | 7/2010 | Grubert et al. | 60/297 |

| | | | | |
|---|---|---|---|---|
| 2010/0183490 | A1* | 7/2010 | Hoke et al. | 423/213.5 |
| 2010/0257843 | A1* | 10/2010 | Hoke et al. | 60/274 |
| 2010/0290964 | A1* | 11/2010 | Southward et al. | 423/213.5 |
| 2011/0061371 | A1* | 3/2011 | Cavataio et al. | 60/286 |

FOREIGN PATENT DOCUMENTS

| | | |
|---|---|---|
| EP | 0935055 | 8/1999 |
| JP | 11226415 | 8/1999 |
| JP | 11300211 | 11/1999 |
| JP | 2005-169203 | 6/2005 |
| JP | 2005205302 | 8/2005 |
| WO | WO 2010/012677 | 2/2010 |

OTHER PUBLICATIONS

PCT International Preliminary Report on Patentability in PCT/IB2011/052512, dated Sep. 7, 2012, 5 pgs.
"Machine Translation of JP 11226415", Jun. 9, 2011, 16 pgs.
"Machine Translation of JP 11300211", Jun. 9, 2011, 14 pgs.
"Machine Translation of JP 2005-169203", Jun. 9, 2011, 13 pgs.
PCT International Search Report in PCT/IB2011/052512, mailed Oct. 20, 2011, 3 pgs.

* cited by examiner

*Primary Examiner* — Cam N. Nguyen
(74) *Attorney, Agent, or Firm* — Servilla Whitney LLC (57) ABSTRACT

Described is a nitrogen oxide storage catalyst comprising:
  a substrate;
  a first washcoat layer provided on the substrate, the first washcoat layer comprising a nitrogen oxide storage material,
  a second washcoat layer provided on the first washcoat layer, the second washcoat layer comprising a hydrocarbon trap material,
wherein the hydrocarbon trap material comprises substantially no element or compound in a state in which it is capable of catalyzing selective catalytic reduction, preferably wherein the hydrocarbon trap material comprises substantially no element or compound in a state in which it is capable of catalyzing a reaction wherein nitrogen oxide is reduced to $N_2$,
said catalyst further comprising a nitrogen oxide conversion material which is either comprised in the second washcoat layer and/or in a washcoat layer provided between the first washcoat layer and the second washcoat layer.

17 Claims, 2 Drawing Sheets

NOX STORAGE CATALYST WITH IMPROVED HYDROCARBON CONVERSION ACTIVITY

CROSS-REFERENCE TO RELATED APPLICATIONS

This application claims the benefit of priority under 35 U.S.C. §119(e) to U.S. Patent Application No. 61/353,236, filed Jun. 10, 2010, which is hereby incorporated by reference in its entirety.

TECHNICAL FIELD

The present invention relates to an NOx storage catalyst with improved hydrocarbon conversion activity, as well as to a method for the treatment of automobile exhaust gas and to a treatment system for an automobile exhaust gas stream.

BACKGROUND

A major problem encountered in the treatment of automotive exhaust gas treatment concerns the so-called "cold start" period of the treatment process, when the exhaust gas as well as the exhaust gas treatment system have low temperatures. At these temperatures, catalytic exhaust gas treatment systems do not display sufficient activity for effectively treating hydrocarbon, NOx and/or CO emissions. As a result, considerable efforts have been made to alleviate this problem, in particular by developing trapping systems which store emissions at low temperatures and subsequently release them at higher temperatures, at which catalytic components present in the system have attained a sufficient activity for treating them.

Thus, trapping materials have been developed for retaining specific emissions during the cold start period of automotive combustion, wherein hydrocarbons and NOx have received the most attention in view of environmental concerns. For ease of implementation, multi-component exhaust gas treatment articles have been developed which aim at combining the various catalytic and trapping activities into as few elements as possible. As a result of this, a large number of products incorporate both catalytic and trapping activities, for example by adopting a multilayer structure wherein the different functions are located in the different layers.

Regarding NOx-trapping components, for example, there is a tendency in their design to combine them with a hydrocarbon trap capable of catalyzing selective catalytic reduction. Thus, JP 11226415 A and JP 11300211 A respectively disclose a NOx storage catalyst comprising a first layer on a substrate which contains a nitrogen oxide storage material, and a second layer provided on the first layer which contains a hydrocarbon trapping material supporting a selective catalytic reduction catalyst. EP 935055 A, on the other hand, additionally teaches the introduction of an intermediate layer to these layers, wherein said layer essentially consists of alumina and/or silica and is free of noble metal, for improving the thermal stability of the active components of the first and third layers. However, the combining of different functions in such multi-component systems often leads to unwanted interactions between the individual functionalities. In particular, it has been found that combining hydrocarbon trapping and selective catalytic reduction functionalities into the same component of a multilayer system affords poor results with respect to the conversion of NOx.

On the other hand, multi-component systems exist which incorporate hydrocarbon and NOx trapping without including elements or compounds capable of catalyzing selective catalytic reduction in the hydrocarbon trapping material. Thus JP 2005169203 A discloses a multilayer NOx trap containing a hydrocarbon trap layer on a substrate and upper layers disposed on the hydrocarbon trap layer which contain a nitrogen oxide storage material and a selective reduction catalyst. Said NOx traps, however, display a decreased conversion rate with respect to hydrocarbons, NOx and CO during the cold start period of exhaust gas treatment compared to NOx traps devoid of the hydrocarbon trapping functionality.

It would be desirable to provide an improved NOx storage catalyst, as well as an improved method for the treatment of automobile exhaust gas and an improved treatment system for an automobile exhaust gas stream. In particular, it would be desirable to provide an NOx storage catalyst with improved hydrocarbon conversion activity which does not impair the catalyst's activity to convert CO and NOx.

SUMMARY

The present invention includes the following embodiments, wherein these include the specific combinations of embodiments as indicated by the respective interdependencies defined therein:

1. A nitrogen oxide storage catalyst comprising:
    a substrate;
    a first washcoat layer provided on the subtstrate, the first washcoat layer comprising a nitrogen oxide storage material,
    a second washcoat layer provided on the first washcoat layer, the second washcoat layer comprising a hydrocarbon trap material,
    wherein the hydrocarbon trap material comprises substantially no element or compound in a state in which it is capable of catalyzing selective catalytic reduction, preferably wherein the hydrocarbon trap material comprises substantially no element or compound in a state in which it is capable of catalyzing a reaction wherein nitrogen oxide is reduced to $N_2$,
    said catalyst further comprising a nitrogen oxide conversion material which is either comprised in the second washcoat layer and/or in a washcoat layer provided between the first washcoat layer and the second washcoat layer.
2. The nitrogen oxide storage catalyst according to embodiment 1, wherein the first washcoat layer further comprises an oxygen storage component, said oxygen storage component preferably comprising at least one compound selected from the group consisting of zirconia, ceria, baria, lanthana, praseodymia, neodymia, and mixtures thereof, wherein more preferably the oxygen storage component comprises ceria and/or zirconia, even more preferably, wherein the oxygen storage component comprises ceria.
3. The nitrogen oxide storage catalyst according to embodiment 1 or 2, wherein the first washcoat layer further comprises at least one platinum group metal, preferably Pt and/or Pd.
4. The nitrogen oxide storage catalyst according to embodiment 3, wherein the first washcoat layer further comprises metal oxide support particles, wherein preferably at least part of the metal oxide support particles support at least part of the at least one platinum group metal, and wherein preferably at least part of said metal oxide support particles comprise at least one compound selected from the group consisting of alumina, titania, titania-alumina, zirconia, zirconia-alumina, baria-alumina, ceria, ceria-alumina, baria-ceria-alumina, lanthana-alumina, lanthana-zirconia-alumina, titania-zirconia, and mixtures thereof, more preferably at least one compound selected from the group consisting of ceria, baria-alumina, ceria-alumina, baria-ceria-alumina, and mixtures thereof, wherein even more preferably at least part of the metal oxide support particles comprise ceria and/or baria-ceria-alumina.

5. The nitrogen oxide storage catalyst according to any one of embodiments 1 to 4, wherein the nitrogen oxide storage material comprises at least one metal compound selected from the group consisting of alkali metal compounds, alkaline earth metal compounds, rare earth metal compounds, and mixtures thereof.

6. The nitrogen oxide storage catalyst according to embodiment 5, wherein the nitrogen oxide storage material comprises at least one element selected from the group consisting of Li, Na, K, Rb, Cs, Mg, Ca, Sr, Ba, Ce, La, Pr, Nd, and mixtures thereof, preferably at least one compound selected from the group consisting of metal oxides of Mg, Ba, Ce, and mixtures thereof, wherein more preferably, the nitrogen oxide storage material comprises magnesia and/or baria.

7. The nitrogen oxide storage catalyst according to any one of embodiments 1 to 6, wherein the nitrogen oxide conversion material comprises an oxygen storage component, wherein the oxygen storage component preferably comprises at least one compound selected from the group consisting of zirconia, ceria, baria, lanthana, praseodymia, neodymia, and mixtures thereof, wherein the oxygen storage component preferably comprises ceria and/or zirconia, even more preferably, wherein the oxygen storage component comprises ceria.

8. The nitrogen oxide storage catalyst according to any one of embodiments 1 to 7, wherein the nitrogen oxide conversion material comprises at least one platinum group metal, wherein the at least one platinum group metal is preferably selected from the group consisting of Pt, Pd, Rh, and mixtures thereof, more preferably Pt and/or Rh.

9. The nitrogen oxide storage catalyst according to embodiment 8, wherein the nitrogen oxide conversion material further comprises metal oxide support particles, wherein preferably at least part of the metal oxide support particles support at least part of the at least one platinum group metal, and wherein more preferably at least part of said metal oxide support particles comprise at least one compound selected from the group consisting of alumina, titania, titania-alumina, zirconia, zirconia-alumina, baria-alumina, ceria, ceria-alumina, baria-ceria-alumina, lanthana-alumina, lanthana-zirconia-alumina, titania-zirconia, and mixtures thereof, more preferably at least one compound selected from the group consisting of alumina, ceria, ceria-alumina, and mixtures thereof, wherein even more preferably at least part of the metal oxide support particles comprise alumina and/or ceria.

10. The nitrogen oxide storage catalyst according to embodiment 9, wherein in the nitrogen oxide conversion material, Rh is supported on other metal oxide support particles than Pt and/or Pd, Rh preferably being supported on metal oxide particles comprising ceria and/or ceria-alumina, more preferably on metal oxide particles comprising ceria.

11. The nitrogen oxide storage catalyst according to embodiment 10, wherein Pt and Pd are supported on the same metal oxide support particles, wherein said metal oxide particles preferably comprise alumina, more preferably gamma-alumina.

12. The nitrogen oxide storage catalyst according to any one of embodiments 1 to 11, wherein the one or more washcoat layers comprising a nitrogen oxide conversion material contain substantially no Mg and no Ba, preferably substantially no element selected from the group consisting of Mg, Ca, Sr, Ba, and combinations thereof, and even more preferably substantially no alkaline earth element.

13. The nitrogen oxide storage catalyst according to any one of embodiments 1 to 12, wherein the hydrocarbon trap material comprises a zeolite, said zeolite preferably being selected from the group consisting of faujasite, chabazite, clinoptilolite, mordenite, silicalite, zeolite X, zeolite Y, ultrastable zeolite Y, ZSM-5 zeolite, ZSM-12 zeolite, SSZ-3 zeolite, SAPO 5 zeolite, offretite, beta zeolite, and mixtures thereof, wherein more preferably the hydrocarbon trap material comprises beta zeolite, and even more preferably H-beta zeolite.

14. The nitrogen oxide storage catalyst according to any one of embodiments 1 to 13, wherein the hydrocarbon trap material further comprises Pt and/or Pd, preferably Pt.

15. The nitrogen oxide storage catalyst according to any one of embodiments 1 to 14, wherein the hydrocarbon trap material comprises substantially no Cu, Co, Mn, Ag, In, Ir, and/or Rh, and even more preferably substantially no Cu, Co, Fe, Mn, Ag, In, Ir, and/or Rh.

16. The nitrogen oxide storage catalyst according to any one of embodiments 1 to 15, wherein the substrate is a monolith, preferably a flow-through monolith, more preferably a flow-through monolith having a honeycomb-structure.

17. A treatment system for an automobile exhaust gas stream comprising
  a combustion engine, preferably a diesel engine or a lean burn gasoline engine, more preferably a diesel engine,
  an exhaust gas conduit in fluid communication with the engine, and
  a nitrogen oxide storage catalyst according to any one of embodiments 1 to 16 provided within the exhaust gas conduit.

18. A method for the treatment of automobile engine exhaust gas comprising:
  (i) providing a nitrogen oxide storage catalyst according to any one of embodiments 1 to 16, and
  (ii) conducting an automobile engine exhaust gas stream over and/or through the nitrogen oxide storage catalyst.

19. The method according to embodiment 18, wherein the automobile engine exhaust gas stream is from a lean burn combustion engine, preferably from a diesel engine or a lean burn gasoline engine, more preferably a diesel engine.

DETAILED DESCRIPTION

Thus, it has surprisingly been found that the NOx storage catalyst according to embodiments of the present invention displays an improved hydrocarbon conversion activity, wherein the catalyst's activity towards the conversion of CO and NOx remains practically unaffected. In particular, it has surprisingly been found that by adopting a specific order of layers in a multilayer NOx storage catalyst, improved hydrocarbon conversion activity which does not impair the catalyst's activity to convert CO and NOx can be achieved.

Thus, an embodiment of the present invention relates to a A nitrogen oxide storage catalyst comprising:
a substrate;
a first washcoat layer provided on the subtstrate, the first washcoat layer comprising a nitrogen oxide storage material,
a second washcoat layer provided on the first washcoat layer, the second washcoat layer comprising a hydrocarbon trap material,
wherein the hydrocarbon trap material comprises substantially no element or compound in a state in which it is capable of catalyzing selective catalytic reduction, preferably wherein the hydrocarbon trap material comprises substantially no element or compound in a state in which it is capable of catalyzing a reaction wherein nitrogen oxide is reduced to $N_2$,
said catalyst further comprising a nitrogen oxide conversion material which is either comprised in the second washcoat layer and/or in a washcoat layer provided between the first washcoat layer and the second washcoat layer.

As the substrate, any material may be used provided that it may support the washcoat layers of the nitrogen oxide storage catalyst and that it is resistant to the conditions which reign during the exhaust gas treatment process. The substrate according to an embodiment of the present invention may be of any conceivable shape, provided that it allows for the fluid contact with at least a portion of the washcoat layers present thereon. Preferably, the substrate is a monolith, wherein more preferably the monolith is a flow-through monolith. Suitable substrates include any of those materials typically used for preparing catalysts, and will usually comprise a ceramic or metal honeycomb structure. Accordingly, the monolithic substrate contains fine, parallel gas flow passages extending from an inlet to an outlet face of the substrate, such that passages are open to fluid flow (referred to as honeycomb flow through substrates). The passages, which are essentially straight paths from their fluid inlet to their fluid outlet, are defined by walls on which the washcoats are disposed, so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, or circular. Such structures may contain up to 900 gas inlet openings (i.e., cells) per square inch of cross section, wherein according to the present invention structures preferably have from 50 to 600 openings per square inch, more preferably from 300 to 500, and even more preferably from 350 to 400.

Thus, according to a preferred embodiment of the present invention, the nitrogen oxide storage catalyst comprises a substrate which is a monolith, preferably a flow-through monolith, more preferably a flow-through monolith having a honeycomb-structure.

According to a further embodiment of the present invention, the nitrogen oxide storage catalyst incorporates the function of a catalyzed soot filter. For these embodiments, the substrate is preferably a honeycomb wall flow filter, wound or packed fiber filter, open-cell foam, or sintered metal filter, wherein wall flow filters are particularly preferred. Useful wall flow substrates have a plurality of fine, substantially parallel gas flow passages extending along the longitudinal axis of the substrate. Typically, each passage is blocked at one end of the substrate body, with alternate passages blocked at opposite end-faces.

Particularly preferred wall flow substrates for use in the present invention include thin porous walled honeycomb monoliths, through which the fluid stream passes without causing too great an increase in back pressure or pressure across the nitrogen oxide storage catalyst. Ceramic wall flow substrates used in the present invention are preferably formed of a material having a porosity of at least 40%, preferably from 40 to 70%, and having a mean pore size of at least 5 microns, preferably from 5 to 30 microns. Further preferred are substrates having a porosity of at least 50% and having a mean pore size of at least 10 microns.

In general, the substrate can be made from materials commonly known in the art. For this purpose, porous materials are preferably used as the substrate material, in particular ceramic and ceramic-like materials such as cordierite, α-alumina, an aluminosilicate, cordierite-alumina, silicon carbide, aluminum titanate, silicon nitride, zirconia, mullite, zircon, zircon mullite, zircon silicate, sillimanite, a magnesium silicate, petalite, spodumene, alumina-silica-magnesia and zirconium silicate, as well as porous refractory metals and oxides thereof. According to an embodiment of the present invention, "refractory metal" refers to one or more metals selected from the group consisting of Ti, Zr, Hf, V, Nb, Ta, Cr, Mo, W, and Re. The substrate may also be formed of ceramic fiber composite materials. According to the present invention, the substrate is preferably formed from cordierite, silicon carbide, and/or from aluminum titanate. In general, materials are preferred which are able to withstand the high temperatures to which a NOx storage catalyst is exposed to, in particular when used in the treatment of automotive exhaust gas. Furthermore, it will be understood that the loading of the catalytic composition on a wall flow substrate will depend on substrate properties such as porosity and wall thickness.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt.-% of the alloy, e.g., 10-25 wt.-% of chromium, 3-8 wt.-% of aluminum and up to 20 wt.-% of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the subsequent adherence of the washcoat compositions to the substrate.

According to a preferred embodiment of the present invention, the first washcoat layer further comprises an oxygen storage component. In principle, any oxygen storage component may be used, provided that it may reversibly store oxygen. Preferably, said oxygen storage component comprises at least one compound selected from the group consisting of zirconia, ceria, baria, lanthana, praseodymia, neodymia, and mixtures thereof. According to a particularly preferred embodiment, the oxygen storage component comprises ceria and/or zirconia, wherein even more preferably the oxygen storage component comprises ceria.

In principle, any possible loading of the oxygen storage component may be chosen in the first washcoat layer, provided that a sufficient amount of oxygen may be stored for the oxidation processes taking place in the NOx storage catalyst and that the function of the remaining components comprised in the NOx storage catalyst is not impaired. In general, the loading of an oxygen storage component in the first washcoat layer may range from 0.1 to 3.0 $g/in^3$, with respect to the weight of the metal contained in the respective compound, wherein the loading of the oxygen storage component preferably ranges from 0.3 to 2.0 $g/in^3$, more preferably from 0.5 to 1.5 $g/in^3$, even more preferably from 0.7 to 1.2 $g/in^3$, even more preferably from 0.75 to 1.15 $g/in^3$, and even more preferably from 0.8 to 0.95 $g/in^3$.

According to the present invention it is further preferred that the first washcoat layer comprises at least one platinum group metal, wherein within the meaning of the present invention the platinum group metals are Ru, Rh, Pd, Os, Ir, and Pt. In a further preferred embodiment, the at least one platinum group metal comprised in the first washcoat layer is Pt and/or Pd. The one or more platinum group metal will typically be present in the first washcoat layer in an amount of up to 200 $g/ft^3$, preferably in an amount of from 10 to 150 $g/ft^3$, more preferably from 15 to 100 $g/ft^3$, more preferably from 20 to 80 $g/ft^3$, more preferably from 30 to 70 $g/ft^3$, and even more preferably of from 35 to 65 $g/ft^3$.

In preferred embodiments of the present invention comprising Pt in the first washcoat layer, the loading thereof in said layer is generally in the range of 10 to 100 $g/ft^3$, preferably in the range of from 15 to 80 $g/ft^3$, more preferably in the range of from 20 to 70 $g/ft^3$, and even more preferably in the range of from 30 to 60 $g/ft^3$.

Furthermore, in preferred embodiments comprising Pd in the first washcoat layer, the loading thereof in said layer is generally in the range of from 1 to 30 $g/ft^3$, preferably in the range of from 2 to 15 $g/ft^3$, more preferably in the range of from 3 to 10 $g/ft^3$, more preferably in the range of from 4 to 8 $g/ft^3$, more preferably in the range of from 5 to 7 $g/ft^3$, and even more preferably in the range of from 6 to 6.5 $g/ft^3$.

According to embodiments of the present invention in which a nitrogen oxide conversion material is at least comprised in a washcoat layer provided between the first and second washcoat layers, it is particularly preferred that at least one platinum group metal is present in the first washcoat layer, preferably in an amount of from 15 to 70 $g/ft^3$, more preferably from 20 to 50 $g/ft^3$, more preferably from 25 to 45 $g/ft^3$, and even more preferably of from 30 to 40 $g/ft^3$. Furthermore, it is further preferred that with respect to preferred embodiments thereof comprising Pt in the first washcoat layer, the loading thereof in said layer is comprised in the range of from 10 to 50 $g/ft^3$, more preferably in the range of from 15 to 45 $g/ft^3$, more preferably in the range of from 20 to 40 $g/ft^3$, and even more preferably in the range of from 25 to 35 $g/ft^3$.

According to further embodiments of the present invention in which a nitrogen oxide conversion material is at least comprised in a washcoat layer provided between the first and second washcoat layers, it is further particularly preferred that at least one platinum group metal is present in the first washcoat layer, preferably in an amount of from 30 to 100 $g/ft^3$, more preferably from 50 to 85 $g/ft^3$, more preferably from 55 to 80 $g/ft^3$, more preferably of from 60 to 75 $g/ft^3$, and even more preferably of from 65 to 70 $g/ft^3$. Furthermore, it is further preferred that with respect to preferred embodiments thereof comprising Pt in the first washcoat layer, the loading thereof in said layer is comprised in the range of from 25 to 95 $g/ft^3$, more preferably in the range of from 45 to 80 $g/ft^3$, more preferably in the range of from 50 to 75 $g/ft^3$, more preferably in the range of from 55 to 70 $g/ft^3$, and even more preferably in the range of from 60 to 65 $g/ft^3$.

According to embodiments of the present invention in which a nitrogen oxide conversion material is at least comprised in the second washcoat layer, it is particularly preferred that at least one platinum group metal is present in the first washcoat layer, preferably in an amount of from 30 to 100 $g/ft^3$, more preferably from 50 to 85 $g/ft^3$, more preferably from 55 to 80 $g/ft^3$, more preferably of from 60 to 75 $g/ft^3$, and even more preferably of from 65 to 70 $g/ft^3$. Furthermore, it is further preferred that with respect to preferred embodiments thereof comprising Pt in the first washcoat layer, the loading thereof in said layer is comprised in the range of from 25 to 95 $g/ft^3$, more preferably in the range of from 45 to 80 $g/ft^3$, more preferably in the range of from 50 to 75 $g/ft^3$, more preferably in the range of from 55 to 70 $g/ft^3$, and even more preferably in the range of from 60 to 65 $g/ft^3$.

In preferred embodiments of the present invention according to which the first washcoat layer comprises one or more platinum group metals, it is further preferred that said layer further comprises metal oxide support particles, wherein preferably at least part of the metal oxide support particles support at least part of the at least one platinum group metal.

In general, the first washcoat layer may contain any possible amount of metal oxide support particles, provided that the function of the remaining components comprised in the NOx storage catalyst is not impaired. In general, the loading of the metal oxide component comprised in the first washcoat layer may range from 1.0 to 5.0 $g/in^3$, and preferably ranges from 1.5 to 4.5 $g/in^3$, more preferably from 2.0 to 4.2 $g/in^3$, and even more preferably from 2.2 to 4.0 $g/in^3$.

In principle, any metal oxide particles may be used in the first washcoat layer, provided that they may adequately support the at least one platinum group metal and that they can withstand the conditions encountered during the treatment of automotive exhaust gas, in particular with respect to the temperatures incurred by the NOx storage catalyst. Preferably, high surface area refractory metal oxide supports such as alumina support materials, also referred to as "gamma alumina" or "activated alumina," are used. Said materials typically exhibit a BET surface area ranging from 60 to 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption. Preferably, the active alumina has a specific surface area comprised in the range of from 60 to 350 $m^2/g$, and typically 90 to 250 $m^2/g$.

According to the present invention, it is preferred that at least part of the metal oxide support particles comprise at least one compound selected from the group consisting of alumina, silica, titania, silica-alumina, titania-alumina, zirconia, zirconia-alumina, baria-alumina, ceria, ceria-alumina, baria-ceria-alumina, lanthana-alumina, lanthana-zirconia-alumina, baria-lanthana-alumina, baria-lanthana-neodymia-alumina, zirconia-silica, titania-silica, titania-zirconia, and mixtures thereof, more preferably at least one compound selected from the group consisting of ceria, baria-alumina, ceria-alumina, baria-ceria-alumina, and mixtures thereof, wherein even more preferably at least part of the metal oxide support particles comprise ceria and/or baria-ceria-alumina.

According to particularly preferred embodiments of the present invention, the metal oxide support particles comprised in the first washcoat layer may be doped with one or more compounds. Thus, the metal oxide support, preferably alumina, comprised in the first washcoat layer is preferably doped with ceria and/or baria, preferably with from 5 to 60 wt.-% of at least one of said compounds, more preferably with from 10 to 50 wt.-%, more preferably with from 20 to 40 wt.-%, more preferably with from 25 to 35 wt.-%, and even more preferably from 28 to 32 wt.-%.

According to preferred embodiments wherein the metal oxide support particles comprise both baria and ceria, the ratio of baria to ceria generally ranges from 4:1 to 1:2, preferably from 3:1 to 1:1, more preferably from 5:2 to 3:2, and even more preferably from 2.2:1 to 1.8:1.

According to the present invention, it is preferred that at least part of the one or more platinum group metals comprised in the first washcoat layer are supported on the metal oxide support particles which are preferred. More preferably, the one or more platinum group metals are supported on the preferred metal oxide support particles according to the present invention.

Concerning the nitrogen oxide storage material comprised in the first washcoat layer, any conceivable element or compound may be used, either alone or in combination with further elements or compounds, provided that said element or compound is capable of reversibly fixing nitrogen oxide. In particular the nitrogen oxide storage material is chosen such that it is capable of binding nitrogen oxide at lower temperatures and subsequently releasing it at higher temperatures, in particular at temperatures at which effective catalytic conversion thereof may be achieved. More specifically, lower temperatures as used in the present context refer to those encountered in automotive exhaust gas purification during cold start conditions, prior to which the engine is at most at ambient temperature. Higher temperatures, on the other hand, refer to those temperatures encountered when the exhaust gas system has attained a temperature at which it is fully operative with respect to exhaust gas treatment, in particular with respect to the conversion efficiency of nitrogen oxide emissions.

Within the meaning of the present invention, it is noted that the term "conversion" is used in the sense that it encompasses both the chemical conversion of emissions to other compounds, as well as the trapping of emissions by chemical and/or adsorptive binding to an appropriate trapping material. This applies in particular to the cold start periods in the treatment of automotive exhaust gas, since the effective trapping of emissions ideally has the effect of temporarily storing them until efficient conversion thereof may be achieved in the hotter phases of exhaust gas treatment. "Emissions" as used in the context of the present invention preferably refers to exhaust gas emissions, more preferably to exhaust gas emissions comprising NOx, CO, and hydrocarbons, and even more preferably to NOx, CO, and hydrocarbons comprised in automotive exhaust gas.

According to the present invention, nitrogen oxide storage materials are preferred which comprise at least one metal compound selected from the group consisting of alkali metal compounds, alkaline earth metal compounds, rare earth metal compounds, and mixtures thereof, preferably from the group consisting of alkaline earth metal compounds, rare earth metal compounds, and mixtures thereof. Preferred alkaline earth metal and rare earth metal compounds are the respective oxides of said compounds.

Among the preferred nitrogen oxide storage materials of the present invention, those are further preferred which comprise at least one element selected from the group consisting of Li, Na, K, Rb, Cs, Mg, Ca, Sr, Ba, Ce, La, Pr, Nd, and mixtures thereof, preferably from the group consisting of Mg, Ba, Ce, and mixtures thereof, wherein the nitrogen oxide storage material preferably comprises Mg and/or Ba. Among the preferred alkaline earth and rare earth metals, these are preferably used as the metal oxides, the nitrogen oxide storage material thus preferably comprising magnesia and/or baria.

In principle, any possible loading of the nitrogen oxide storage material may be chosen, provided that a sufficient amount of nitrogen oxide may be stored, and that the function of the remaining components comprised in the NOx storage catalyst is not impaired. In general, the loading of the nitrogen oxide storage material in the first washcoat layer may range from 0.05 to 1.0 g/in$^3$, with respect to the weight of the metal contained in the respective compound, wherein the loading preferably ranges from 0.10 to 0.8 g/in$^3$, more preferably from 0.15 to 0.6 g/in$^3$, more preferably from 0.20 to 0.55 g/in$^3$, and even more preferably from 0.25 to 0.50 g/in$^3$.

Concerning the nitrogen oxide conversion material comprised in the second washcoat layer and/or in a washcoat layer provided between the first and second washcoat layers, any conceivable element or compound may be used, either alone or in combination with further elements or compounds, provided that said element or compound is capable of converting nitrogen oxide, preferably of converting nitrogen oxide to diatomic nitrogen. According to an embodiment of the present invention, the conversion of nitrogen oxide in the nitrogen oxide conversion material is primarily achieved by chemical conversion thereof to another compound, preferably to diatomic nitrogen. Preferably, conversion of nitrogen oxide in the nitrogen oxide conversion material is substantially achieved by chemical conversion thereof to another compound.

Regarding the nitrogen oxide conversion material, it is further preferred according to the present invention that said material comprises an oxygen storage component. In principle, any oxygen storage component may be used, provided that it may reversibly store oxygen. According to preferred embodiments of the present invention, the oxygen storage component of the nitrogen oxide conversion material comprises at least one compound selected from the group consisting of zirconia, ceria, baria, lanthana, praseodymia, neodymia, and mixtures thereof. More preferably, the oxygen storage component comprises ceria and/or zirconia, wherein even more preferably the oxygen storage component comprises ceria.

In principle, any possible loading of the oxygen storage component may be chosen, provided that a sufficient amount of oxygen may be stored for the oxidation processes taking place in the NOx storage catalyst and that the function of the remaining components comprised in the NOx storage catalyst is not impaired. In general, the loading of an oxygen storage component in the second washcoat layer may range from 0.1 to 1.5 g/in$^3$, wherein the loading of the oxygen storage component preferably ranges from 0.2 to 1.2 g/in$^3$, more preferably from 0.3 to 1.0 g/in$^3$, more preferably from 0.4 to 0.9 g/in$^3$, more preferably from 0.45 to 0.8 g/in$^3$, and even more preferably from 0.50 to 0.75 g/in$^3$.

According to the present invention it is further preferred that the nitrogen oxide conversion material comprises at least one platinum group metal. Preferably, the nitrogen oxide conversion material comprises at least one platinum group metal selected from the group consisting of Pt, Pd, Rh, and mixtures thereof, wherein more preferably the at least one platinum group metal is Pt and/or Rh, and even more preferably the nitrogen oxide conversion material comprises Pt and Rh, preferably, Pt, Pd, and Rh. According to the present invention, the one or more platinum group metal may be present in an amount of up to 200 g/ft$^3$, preferably from 10 to 150 g/ft$^3$, more preferably from 20 to 120 g/ft$^3$, more preferably from 30 to 100 g/ft$^3$, more preferably from 40 to 90 g/ft$^3$, more preferably from 45 to 85 g/ft$^3$, and even more preferably from 50 to 80 g/ft$^3$.

In preferred embodiments of the present invention comprising Pt in the second washcoat layer and/or in a washcoat layer provided between the first and second washcoat layers, the loading thereof in said layers may respectively range from 10 to 150 g/in$^3$, wherein the loading of Pt is preferably from 20 to 100 g/in$^3$, more preferably from 30 to 90 g/in$^3$, more preferably from 35 to 80 g/in$^3$, and even more preferably from 40 to 75 g/in$^3$.

Furthermore, in preferred embodiments comprising Pd and/or Rh in the second washcoat layer and/or in a washcoat layer provided between the first and second washcoat layers, more preferably Rh, the respective loading of said platinum group metals in said layers is generally in the range of from 1 to 15 g/in$^3$, and preferably in the range of from 1.5 to 12 g/in$^3$, more preferably in the range of from 2.0 to 10 g/in$^3$, more preferably in the range of from 2.5 to 9 g/in$^3$, more preferably in the range of from 3.0 to 8 g/in$^3$, more preferably in the range of from 3.5 to 7 g/in$^3$, and even more preferably in the range of from 4.0 to 6.5 g/in$^3$.

According to particularly preferred embodiments containing both Pd and Rh in the second washcoat layer and/or in a washcoat layer provided between the first and second washcoat layers, the amount of Pd is generally in the range of from 1 to 8 g/in$^3$, and preferably in the range of from 2 to 7 g/in$^3$, more preferably of from 2.5 to 6 g/in$^3$, more preferably of from 3.0 to 5 g/in$^3$, and even more preferably of from 3.5 to 4.5 g/in$^3$, and the amount of Rh is generally in the range of from 1 to 15 g/in$^3$, and preferably in the range of from 2 to 12 g/in$^3$, more preferably of from 3 to 10 g/in$^3$, more preferably of from 4 to 9 g/in$^3$, more preferably of from 5 to 8 g/in$^3$, and even more preferably of from 6 to 7 g/in$^3$.

In preferred embodiments of the present invention, according to which the nitrogen oxide conversion material comprises one or more platinum group metals, it is further preferred that the nitrogen oxide conversion material comprises metal oxide support particles, wherein preferably at least part of the metal oxide support particles support at least part of the at least one platinum group metal.

In principle, any metal oxide particles may be used, provided that they may adequately support the at least one platinum group metal and that they can withstand the conditions encountered during the treatment of automotive exhaust gas, in particular with respect to the temperatures incurred by the NOx storage catalyst. Preferably, high surface area refractory metal oxide supports such as alumina support materials, also referred to as "gamma alumina" or "activated alumina," are used. Said materials typically exhibit a BET surface area ranging from 60 to 200 m$^2$/g or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption. Preferably, the active alumina has a specific surface area comprised in the range of from 60 to 350 m$^2$/g, and typically 90 to 250 m$^2$/g.

According to the present invention, it is preferred that at least part of the metal oxide support particles comprise at least one compound selected from the group consisting of alumina, silica, titania, silica-alumina, titania-alumina, zirconia, zirconia-alumina, baria-alumina, ceria, ceria-alumina, baria-ceria-alumina, lanthana-alumina, lanthana-zirconia-alumina, baria-lanthana-alumina, baria-lanthana-neodymia-alumina, zirconia-silica, titania-silica, titania-zirconia, and mixtures thereof. In particularly preferred embodiments, at least part of the metal oxide support particles comprise at least one compound selected from the group consisting of alumina, ceria, ceria-alumina, and mixtures thereof, wherein even more preferably at least part of the metal oxide support particles comprise alumina and/or ceria.

In general, the second washcoat layer and/or a washcoat layer provided between the first and second washcoat layers may contain any possible amount of metal oxide support particles, provided that the function of the remaining components comprised in the NOx storage catalyst is not impaired. In embodiments of the present invention wherein the second washcoat layer comprises a nitrogen oxide conversion material, and preferably in embodiments which furthermore do not comprise a washcoat layer provided between the first and second washcoat layers, the loading of the metal oxide component in the second washcoat layer may range from 0.1 to 5 g/in$^3$, with respect to the weight of the metal contained in the respective compound, wherein the loading preferably ranges from 0.5 to 3.5 g/in$^3$, more preferably from 0.8 to 3.0 g/in$^3$, more preferably from 0.9 to 2.5 g/in$^3$, more preferably from 1 to 2.3 g/in$^3$, and even more preferably from 1 to 1.5 g/in$^3$.

According to preferred embodiments comprising metal oxide particles which comprise ceria as well as metal oxide particles which comprise alumina, it is particularly preferred that the ratio of ceria to alumina be comprised in the range of from 1:4 to 5:1, more preferably from 1:3 to 4:1, more preferably from 2:5 to 7:2, and even more preferably from 1:2 to 3:1.

According to further preferred embodiments, the platinum group metals supported on at least part of the metal oxide particles comprise Rh as well as at least one further platinum group metal being preferably Pt and/or Pd, more preferably Pt and Pd. With respect to said embodiments, it is preferred that Rh is supported on other metal oxide support particles than Pt and/or Pd, preferably Pt and Pd, wherein Rh is preferably supported on metal oxide particles comprising ceria and/or ceria-alumina, even more preferably on metal oxide particles comprising ceria. Furthermore, in preferred embodiments comprising Pt and Pd, said platinum group metals are preferably supported on the same metal oxide support particles, wherein said metal oxide particles preferably comprise alumina.

According to the present invention, it is further preferred that the second washcoat layer and/or a washcoat layer provided between the first and second washcoat layers contains substantially no Mg and no Ba. According to a further preferred embodiment of the present invention, the second washcoat layer and/or a washcoat layer provided between the first and second washcoat layers contains substantially no element selected from the group consisting of Mg, Ca, Sr, Ba, and combinations thereof, wherein even more preferably, the second washcoat layer and/or a washcoat layer provided between the first and second washcoat layers contains substantially no alkaline earth element.

Regarding the hydrocarbon trap material comprised in the nitrogen oxide storage catalyst of embodiments of the present invention, any material may be used, provided that it has the ability of reversibly trapping hydrocarbons, and in particular hydrocarbon emissions produced during the cold start period in automotive exhaust gas treatment. More specifically, the hydrocarbon trap materials which may be used in embodiments of the present invention are capable of binding hydrocarbons at lower temperatures and subsequently releasing them at higher temperatures, in particular at temperatures at which effective catalytic conversion thereof may be achieved. More specifically, lower temperatures as used in the context of the present invention refer to those encountered in automotive exhaust gas purification during cold start conditions, prior to which the engine is at most at ambient temperature. Higher temperatures, on the other hand, refer to those temperatures encountered when the exhaust gas system has attained a temperature at which it is fully operative with respect to exhaust gas treatment, in particular with respect to the catalytic conversion of hydrocarbon emissions.

Among the hydrocarbon trap materials which may be used in embodiments of the present invention, those materials are preferred which comprise a zeolite, preferably a zeolite selected from the group consisting of faujasite, chabazite, clinoptilolite, mordenite, silicalite, zeolite X, zeolite Y, ultrastable zeolite Y, ZSM-5 zeolite, ZSM-12 zeolite, SSZ-3 zeolite, SAPO 5 zeolite, offretite, beta zeolite, and mixtures thereof. According to particularly preferred embodiments, the hydrocarbon trap material comprises beta zeolite, preferably H-beta zeolite.

According to embodiments of the present invention, it is particularly preferred that the zeolites used have a high silica to alumina ratio. Typically, such zeolites will have a silica/alumina molar ratio of at least about 25/1, preferably of at least about 50/1, more preferably wherein the silica/alumina molar ratio ranges from 25/1 to 1000/1, more preferably from 50/1 to 500/1. Further preferred are zeolites of which the silica/alumina molar ratio ranges from 25/1 to 300/1, more preferably from about 100/1 to 250/1. According to yet a further preferred embodiment of the present invention, the silica/alumina molar ratio of the zeolites range from 35/1 to 180/1.

In principle, the second washcoat layer may contain any possible amount of hydrocarbon trap material, provided that the function of the remaining components comprised in the NOx storage catalyst is not impaired. In general, the loading of the hydrocarbon trap material in the washcoat layer may range from 0.10 to 1.5 g/in$^3$, preferably from 0.15 to 1.0 g/in$^3$, more preferably from 0.20 to 0.7 g/in$^3$, more preferably from 0.25 to 0.6 g/in$^3$, and even more preferably from 0.3 to 0.5 g/in$^3$.

According to the present invention, it is further preferred that the hydrocarbon trap material further comprises Pt and/or Pd, more preferably Pt, wherein the platinum group metals in the hydrocarbon trap material will typically be present in an amount of up to 50 g/ft$^3$, preferably from 0.05 to 20 g/ft$^3$, more preferably from 0.1 to 15 g/ft$^3$, more preferably from 0.5 to 12 g/ft$^3$, more preferably from 1.0 to 10 g/ft$^3$, and even more preferably of from 2 to 8 g/ft$^3$.

According to embodiments of the present invention wherein the NOx storage catalyst comprises a washcoat layer provided between the first and second washcoat layers, and preferably wherein furthermore the second washcoat layer does not comprise a nitrogen oxide conversion material, it is preferred that the second washcoat layer comprises metal oxide support particles. In embodiments thereof further comprising one or more platinum group metals in the second washcoat layer, it is further preferred that the metal oxide support particles support at least part of the at least one platinum group metal. In principle, any metal oxide particles may be used, provided that they may adequately support the at least one platinum group metal and that they can withstand the conditions encountered during the treatment of automotive exhaust gas, in particular with respect to the temperatures incurred by the NOx storage catalyst during exhaust gas treatment. In particularly preferred embodiments, the metal oxide support particles comprise alumina.

According to said preferred embodiments, the second washcoat layer may contain any possible amount of metal oxide support particles, provided that the function of the remaining components comprised in the NOx storage catalyst is not impaired. In general, the loading of the metal oxide component in the second washcoat layer of said preferred embodiments may range from 0.01 to 3.0 g/in$^3$, wherein the loading preferably ranges from 0.05 to 2.0 g/in$^3$, more preferably from 0.10 to 1.0 g/in$^3$, more preferably from 0.15 to 0.5 g/in$^3$, and even more preferably from 0.2 to 0.3 g/in$^3$.

It is an essential feature of embodiments of the present invention that the hydrocarbon trap material comprises substantially no element or compound in a in a state in which it would be capable of catalyzing selective catalytic reduction. According to embodiments of the present invention, the term "selective catalytic reduction" refers to the catalytic treatment of gasoline engine exhaust gas, wherein nitrogen oxide is reduced to diatomic nitrogen by reaction with reductive emissions present in the exhaust gas. Preferably, the term refers to the catalytic treatment of automotive exhaust gas in general. According to the present invention, it is particularly preferred that the term "selective catalytic reduction" refers to a catalyzed reaction wherein gaseous nitrogen oxide is reduced to diatomic nitrogen.

Thus, according to embodiments of the present invention, the hydrocarbon trap material substantially does not catalyze the selective catalytic reduction of nitrogen oxide. Preferably, this refers to hydrocarbon trap materials of which the catalytic activity towards the selective catalytic reduction of nitrogen oxide within the meaning of the present invention does not exceed the catalytic activity of a hydrocarbon trap material comprising substantially no Cu and/or Co, more preferably of a hydrocarbon trap material comprising substantially no Cu, Co, Mn, Ag, In, Ir, and/or Rh, and even more preferably comprising substantially no Cu, Co, Fe, Mn, Ag, In, Ir, and/or Rh. According to the present invention, it is particularly preferred that the hydrocarbon trap material does not display a catalytic activity towards selective catalytic reduction within the meaning of the present invention which would exceed the activity of a hydrocarbon trap material which contains substantially no transition metal element apart from Pt and/or Pd, preferably of a hydrocarbon trap material which contains substantially no transition metal element apart from Pt, and more preferably of a hydrocarbon trap material which contains substantially no transition metal element, wherein the hydrocarbon trap material preferably refers to the respectively preferred hydrocarbon trap materials of the present invention.

Within the meaning of the present invention, a material is defined as not comprising a substantial amount of a specific element when it contains 1 wt.-% or less of said element, preferably 0.5 wt.-% or less, more preferably 0.01 wt.-% or less, more preferably 0.005 wt.-% or less, and even more preferably 0.001 wt.-% or less thereof.

The nitrogen oxide storage catalyst according to the present invention can be readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is preferably sufficiently porous to permit the passage there through of the gas stream being treated.

The several components of the nitrogen oxide storage catalyst material may be applied to the substrate as mixtures of one or more components in sequential steps in a manner which will be readily apparent to those skilled in the art of catalyst manufacture. A typical method of manufacturing the nitrogen oxide storage catalyst of the present invention is to respectively provide the nitrogen oxide storage material, the nitrogen oxide conversion material, and the hydrocarbon trap material as a coating or washcoat layer on the walls of the gas-flow passages of a suitable carrier member. According to certain embodiments of the present invention, the nitrogen oxide conversion material and the hydrocarbon trap material are provided in a single washcoat on the substrate.

According to the present invention, the components of the individual washcoat layers may respectively be processed to a slurry, preferably to an aqueous slurry. The substrate may then be sequentially immersed into the respective slurries for the individual washcoats, after which excess slurry is removed to provide a thin coating of the two or more slurries on the walls of the gas-flow passages of the substrate. The coated substrate is then dried and calcined to provide an adherent coating of the respective component to the walls of the passages. Thus, after providing the first washcoat layer on the substrate, the coated substrate may then be immersed into a further slurry of the nitrogen oxide conversion material or a mixture of the nitrogen oxide conversion material and the hydrocarbon trap material to form a second washcoat layer deposited over the first washcoat layer. The substrate is then dried and/or calcined and eventually coated with a third washcoat comprising the hydrocarbon trap material, which again is subsequently dried and/or calcined to provide a finished nitrogen oxide storage catalyst in accordance with one embodiment of the present invention.

In addition to the above-mentioned nitrogen oxide storage catalyst, embodiments of the present invention are also directed to treatment systems for an automobile exhaust gas stream. In particular, the treatment system of the present invention comprises a combustion engine, preferably a diesel engine, an exhaust gas conduit in fluid communication with the engine, and a nitrogen oxide storage catalyst as described herein which is provided within the exhaust gas conduit. In principle, any conceivable combustion engine may be used in the treatment system of the present invention, wherein preferably a lean burn engine is used such as a diesel engine or a lean burn gasoline engine, more preferably a diesel engine.

Thus, embodiments of the present invention also relate to a treatment system for an automobile exhaust gas stream comprising a combustion engine, preferably a diesel engine or a lean burn gasoline engine, more preferably a diesel engine, an exhaust gas conduit in fluid communication with the engine, and a nitrogen oxide storage catalyst according to the present invention provided within the exhaust gas conduit.

According to a preferred embodiment, the treatment system further comprises a soot filter component and/or a selective catalytic reduction (SCR) component. In said embodiments, the nitrogen oxide storage catalyst can be located upstream or downstream from the soot filter and/or selective catalytic reduction component. According to a particularly preferred embodiment, the soot filter is a catalyzed soot filter (CSF). Any suitable CSF can be used according to the present invention. Preferably, the CSF of the present invention comprises a substrate coated with a washcoat layer containing one or more catalysts for burning off trapped soot and/or oxidizing exhaust gas stream emissions. In general, the soot burning catalyst can be any known catalyst for combustion of soot. For example, the CSF can be coated with a one or more high surface area refractory oxides (such as e.g. alumina, silica, silica alumina, zirconia, and zirconia alumina) and/or with an oxidation catalyst (such as e.g. a ceria-zirconia) for the combustion of unburned hydrocarbons and to some degree particulate matter. However, preferably the soot burning catalyst is an oxidation catalyst comprising one or more precious metal catalysts (platinum, palladium, and/or rhodium).

According to a further preferred embodiment, the treatment system of the present invention further comprises a selective catalytic reduction (SCR) component. The SCR component is preferably located downstream of the nitrogen oxide storage catalyst and upstream or downstream of the soot filter. A suitable SCR catalyst component for use in the emission treatment system is able to effectively catalyze the reduction of the $NO_x$ component at temperatures below 600° C., so that adequate NO levels can be treated even under conditions of low load which typically are associated with lower exhaust temperatures. Preferably, the catalyst article is capable of converting at least 50% of the $NO_x$ component to $N_2$, depending on the amount of a reductant such as $NH_3$ which is preferably added to the system. In this respect, another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. No. 4,961,917 and U.S. Pat. No. 5,516,497. Suitable compositions include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations.

In addition to these embodiments, the present invention also relates to a method for the treatment of automobile engine exhaust gas using the nitrogen oxide storage catalyst of the present invention. More specifically, the method of the present invention includes conducting an automobile engine exhaust gas over and/or through the nitrogen oxide storage catalyst, wherein the automobile engine exhaust gas is preferably only conducted through the nitrogen oxide storage catalyst.

Thus, embodiments of the present invention also concern a method for the treatment of automobile engine exhaust gas comprising:
(i) providing a nitrogen oxide storage catalyst according to the present invention, and
(ii) conducting an automobile engine exhaust gas stream over and/or through the nitrogen oxide storage catalyst.

In the method of the present invention, it is preferred that the automobile engine exhaust gas is from a lean burn combustion engine, preferably from a diesel engine or a lean burn gasoline engine, more preferably a diesel engine.

EXAMPLES

Example 1

Onto a honeycomb flow-through monolith substrate (5.66 in×5.66 in×3 in; 1.2 L; 400 cpsi/6 mil) was provided a first washcoat layer washcoat containing 2.4 g/in$^3$ activated alumina containing 10 wt.-% ceria and 20 wt.-% barium oxide, 0.2 g/in$^3$ Ce as cerium nitrate, 0.5 g/in$^3$ Ba as barium oxide and 0.1 g/in$^3$ Zr as zirconium oxide, said layer further containing 29 g/ft$^3$ Pt and 6 g/ft$^3$ Pd.

A second washcoat layer was then provided on the first layer, said second layer containing 0.25 g/in$^3$ Al$_2$O$_3$ and 0.75 g/in$^3$ ceria, said layer further containing a loading of 75 g/ft$^3$ Pt and 6 g/ft$^3$ Rh.

Finally, a third washcoat layer was provided on the second layer, said third layer containing 0.25 g/in$^3$ Al$_2$O$_3$ and 0.5 g/in$^3$ H-beta-zeolite, said layer further containing 4 g/ft$^3$ Pt.

The resulting layered NOx trap catalyst contained a total of 108 g/ft$^3$ Pt, 6 g/ft$^3$ Pd and 6 g/ft$^3$ Rh.

Example 2

The layered NOx trap catalyst was disposed on a honeycomb flow-through monolith substrate having a volume of 73.17 in$^3$ (1.2 L), a cell density of 400 cells per square inch, and a wall thickness of approximately 100 μm.

The first coat provided on the substrate contained a washcoat of 3.84 g/in$^3$ activated alumina containing 10 wt.-% ceria and 18 wt.-% barium oxide, 1.104 g/in$^3$ ceria (87% of the ceria being in particulate form), 0.24 g/in$^3$ Mg as magnesium oxide, and 0.096 g/in$^3$ Zr as zirconium oxide, said layer further comprising 63 g/ft$^3$ Pt and 6.5 g/ft$^3$ Pd.

The second coat provided on the first coat contained a washcoat of 0.7 g/in$^3$ activated alumina bearing 40 g/ft$^3$ Pt and 4 g/ft$^3$ Pd, 0.5 g/in$^3$ ceria bearing 6.5 g/ft$^3$ Rh, with substantially no alkaline earth component being present in the second washcoat layer.

The third coat provided on the second coat contained a washcoat of 0.25 g/in$^3$ Al$_2$O$_3$ and 0.5 g/in$^3$ H-beta-zeolite bearing 4 g/ft$^3$ Pt.

The resulting layered NOx trap catalyst contained a total of 107 g/ft$^3$ Pt, 10.5 g/ft$^3$ Pd and 6.5 g/ft$^3$ Rh.

Example 3

The layered NOx trap catalyst was disposed on a honeycomb flow-through monolith substrate having a volume of 73.17 in$^3$ (1.2 L), a cell density of 400 cells per square inch, and a wall thickness of approximately 100 μm.

The first coat provided on the substrate contained a washcoat of 3.69 g/in$^3$ activated alumina containing 10 wt.-% ceria and 18 wt.-% barium oxide, 1.06 g/in$^3$ ceria (87% of the ceria being in particulate form), 0.23 g/in$^3$ Mg as magnesium oxide, and 0.092 g/in$^3$ Zr as zirconium oxide, said layer further containing 61 g/ft$^3$ Pt and 6.5 g/ft$^3$ Pd.

The second coat provided on the first coat contained a washcoat of 0.6 g/in$^3$ activated alumina bearing 40 g/ft$^3$ Pt and 4 g/ft$^3$ Pd, 0.5 g/in$^3$ ceria bearing 6.5 g/ft$^3$ Rh, and 0.3 g/in$^3$ H-beta-zeolite bearing 2 g/ft$^3$ Pt, with substantially no alkaline earth component being present in the second washcoat layer.

The resulting layered NOx trap catalyst contained a total of 103 g/ft$^3$ Pt, 10.5 g/ft$^3$ Pd and 6.5 g/ft$^3$ Rh.

Comparative Example 1

The layered NOx trap catalyst was disposed on a honeycomb flow-through monolith substrate having a volume of 73.17 in3 (1.2 L), a cell density of 400 cells per square inch, and a wall thickness of approximately 100 μm.

The first coat provided on the substrate contained a washcoat of 0.25 g/in$^3$ Al$_2$O$_3$ and 0.5 g/in$^3$ H-beta-zeolite bearing 4 g/ft$^3$ Pt.

The second coat provided on the first coat contained a washcoat of 2.4 g/in$^3$ activated alumina containing 10 wt.-% ceria and 20 wt.-% barium oxide, 0.2 g/in$^3$ Ce as cerium nitrate, 0.5 g/in$^3$ Ba as barium oxide and 0.1 g/in$^3$ Zr as zirconium oxide, said layer further containing 29 g/ft$^3$ Pt and 6 g/ft$^3$ Pd.

The third coat provided in the second coat contained a washcoat of 0.25 g/in$^3$ activated alumina bearing 75 g/ft$^3$ Pt and 0.75 g/in$^3$, ceria bearing 6 g/ft$^3$ Rh, with substantially no alkaline earth component being present in said second washcoat layer.

The resulting layered NOx trap catalyst contained a total of 108 g/ft$^3$ Pt, 6 g/ft$^3$ Pd and 6 g/ft$^3$ Rh.

Comparative Example 2

The layered NOx trap catalyst was disposed on a honeycomb flow-through monolith substrate having a volume of 73.17 in$^3$ (1.2 L), a cell density of 400 cells per square inch, and a wall thickness of approximately 100 μm.

The first coat provided on the substrate contained a washcoat of 2.4 g/in$^3$ activated alumina containing 10 wt.-% ceria and 20 wt.-% barium oxide, 0.2 g/in$^3$ Ce as cerium nitrate, 0.5 g/in$^3$ Ba as barium oxide and 0.1 g/in$^3$ Zr as zirconium oxide, said layer further containing 38.4 g/ft$^3$ Pt and 4 g/ft$^3$ Pd.

The second coat provided on the first coat contained a washcoat of 1.5 g/in$^3$ activated alumina bearing 99.6 g/ft$^3$ Pt and 0.75 g/in$^3$ ceria bearing 8 g/ft$^3$ Rh, with substantially no alkaline earth component being present in the second washcoat layer.

The resulting layered NOx trap catalyst contained a total of 134 g/ft$^3$ Pt, 4 g/ft$^3$ Pd and 8 g/ft$^3$ Rh.

Comparative Example 3

The layered NOx trap catalyst was disposed on a honeycomb flow-through monolith substrate having a volume of 73.17 in$^3$ (1.2 L), a cell density of 400 cells per square inch, and a wall thickness of approximately 100 μm.

The first coat provided on the substrate contained a washcoat of 3.84 g/in$^3$ activated alumina containing 10 wt.-% ceria and 18 wt.-% barium oxide, 1.104 g/in$^3$ ceria (87% of the ceria being in particulate form), 0.24 g/in$^3$ Mg as magnesium oxide, and 0.096 g/in$^3$ Zr as zirconium oxide, said layer further comprising 63 g/ft$^3$ Pt and 6.5 g/ft$^3$ Pd. The second coat provided on the first coat contained a washcoat of 0.7 g/in$^3$ activated alumina bearing 40 g/ft$^3$ Pt and 4 g/ft$^3$ Pd, 0.5 g/in$^3$ ceria bearing 6.5 g/ft$^3$ Rh, with substantially no alkaline earth component being present in the second washcoat layer.

The resulting NOx trap catalyst contained a total of 103 g/ft$^3$ Pt, 10.5 g/ft$^3$ Pd and 6.5 g/ft$^3$ Rh.

Catalyst Testing

The catalysts were all ovenaged under hydrothermal conditions with 10% steam and 10% oxygen. Aging was done for 5 h at 750° C. After aging the catalysts were tested on dynamic engine bench in MVEG driving cycle (cold start) conditions using a transient test cell with an OM 646 engine.

In the European driving cycle, hydrocarbons have to be stored at low temperature conditions during cold start. For this purpose, hydrocarbon/carbon monoxide and DeNOx activity was evaluated during certification cycle (New European Driving Cycle, EU2000

Figure 1:
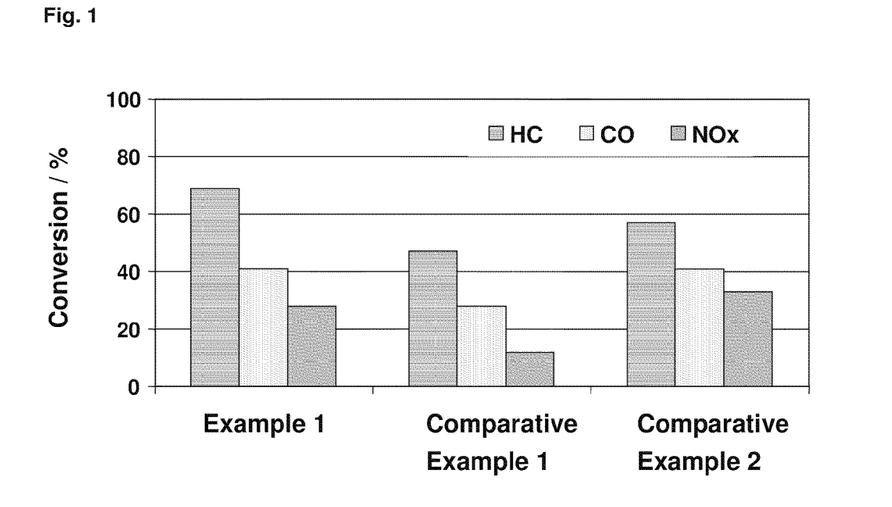
FIG. 1 displays results from testing of the NOx storage catalysts of Example 1 and Comparative Examples 1 and 2 with respect to the conversion of hydrocarbons, carbon monoxide, and NOx emissions contained in automotive exhaust gas under cold start conditions. The values of "Conversion/%" indicate the percentage of the respective substances originally contained in the automotive exhaust gas which have been converted after the exhaust has passed the NOx storage catalyst according to said examples.

FIG. 1 displays results from the testing of Example 2 and Comparative Examples 1 and 2 with respect to the conversion of hydrocarbons, carbon monoxide and NOx under cold start conditions according to the testing procedure described in the foregoing. In particular, the conversion value reflects the amount of emissions which has been removed from the exhaust gas stream by means of trapping and/or of conversion to a different chemical compound. In this respect, the test results in FIG. 1 show that a hydrocarbon trapping layer as top/over coat to a NOx trap catalysts as present in Example 2 is able to lower hydrocarbon emissions while maintaining a sufficient rate of carbon monoxide and NOx conversion compared to an NOx storage catalyst which contains no hydrocarbon trap material (Comparative Example 2). When the hydrocarbon layer is used as undercoat as in Comparative Example 1, it may not efficiently lower hydrocarbon cold start emissions compared to the NOx trap formulation which does not contain a hydrocarbon trap material (Comparative Example 2). Furthermore, as may be taken from FIG. 2, the ability of such an NOx storage catalyst containing a hydrocarbon undercoat is considerably worsened compared to the NOx storage catalyst of Comparative Example 2 which does not contain a hydrocarbon trap component.

Figure 2:
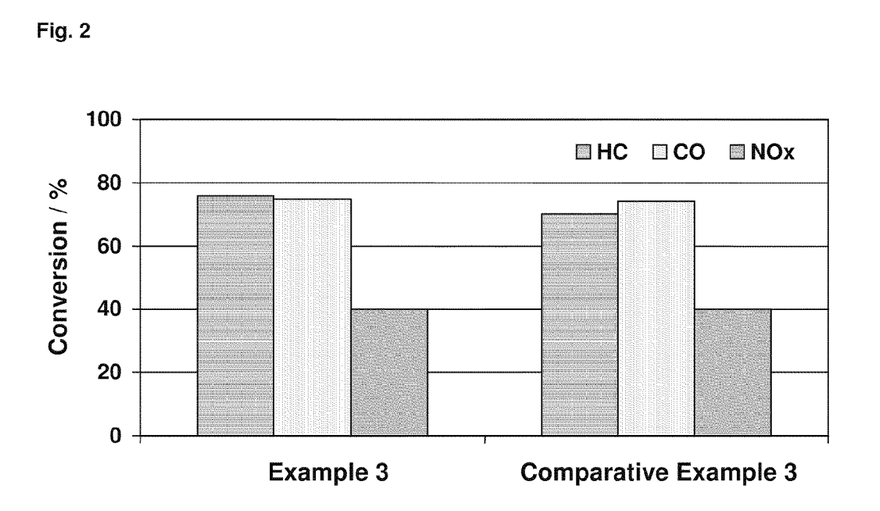
FIG. 2 displays results from testing of the NOx storage catalysts of Example 3 and Comparative Example 3 with respect to the conversion of hydrocarbons, carbon monoxide, and NOx emissions contained in automotive exhaust gas under cold start conditions. The values of "Conversion/%" have the same meaning as described above for FIG. 1.

Same applies with respect to the results displayed in FIG. 2 from the testing of Example 3 with the hydrocarbon trapping layer as top/over coat compared to results from testing of Comparative Example 3 which contains no hydrocarbon trap component. Thus, as for Example 2, the NOx storage catalyst according to Example 3 displays an improved hydrocarbon conversion capacity due to the presence of the hydrocarbon trapping material in the top layer. In particular, as may be taken from the results in FIG. 2, the NOx storage catalyst's capacity of converting carbon monoxide and of storing NOx under cold start conditions is not impaired by the additional presence of the hydrocarbon trapping element in the top layer, since comparable results are achieved in this respect in for both the NOx storage catalyst according to Example 3, which contains a hydrocarbon trapping element, as well as for the catalyst according to Comparative Example 3, which contains no such hydrocarbon trapping element.

The invention claimed is:

1. A nitrogen oxide storage catalyst comprising:
a substrate;
a first washcoat layer provided on the substrate, the first washcoat layer comprising a nitrogen oxide storage material, wherein the nitrogen oxide storage material comprises at least one metal compound selected from the group consisting of alkali metal compounds, alkaline earth metal compounds, rare earth metal compounds, and mixtures thereof,
a second washcoat layer provided on the first washcoat layer, the second washcoat layer comprising a hydrocarbon trap material, wherein the hydrocarbon trap material comprises a zeolite,
wherein the hydrocarbon trap material comprises substantially no element or compound in a state in which it is capable of catalyzing selective catalytic reduction,
said catalyst further comprising a nitrogen oxide conversion material which is either comprised in the second washcoat layer and/or in an optional washcoat layer provided between the first washcoat layer and the second washcoat layer.

2. The nitrogen oxide storage catalyst according to claim 1, wherein the hydrocarbon trap material comprises substantially no element or compound in a state in which it is capable of catalyzing a reaction wherein nitrogen oxide is reduced to $N_2$.

3. The nitrogen oxide storage catalyst according to claim 1, wherein the first washcoat layer further comprises an oxygen storage component.

4. The nitrogen oxide storage catalyst according to claim 1, wherein the first washcoat layer further comprises at least one platinum group metal.

5. The nitrogen oxide storage catalyst according to claim 4, wherein the first washcoat layer further comprises metal oxide support particles.

6. The nitrogen oxide storage catalyst according to claim 1, wherein the nitrogen oxide storage material comprises at least one element selected from the group consisting of Li, Na, K, Rb, Cs, Mg, Ca, Sr, Ba, Ce, La, Pr, Nd, and mixtures thereof.

7. The nitrogen oxide storage catalyst according to claim 1, wherein the nitrogen oxide conversion material comprises an oxygen storage component.

8. The nitrogen oxide storage catalyst according to claim 1, wherein the nitrogen oxide conversion material comprises at least one platinum group metal.

9. The nitrogen oxide storage catalyst according to claim 8, wherein the nitrogen oxide conversion material further comprises metal oxide support particles.

10. The nitrogen oxide storage catalyst according to claim 1, wherein the nitrogen oxide conversion material comprises Pt, Pd, and metal oxide support particles, wherein Pt and Pd are supported on the same metal oxide support particles, wherein said metal oxide particles comprise alumina.

11. The nitrogen oxide storage catalyst according to claim 1, wherein the one or more washcoat layers comprising a nitrogen oxide conversion material contain substantially no Mg and no Ba.

12. The nitrogen oxide storage catalyst according to claim 1, wherein the hydrocarbon trap material further comprises Pt and/or Pd.

13. The nitrogen oxide storage catalyst according to claim 1, wherein the hydrocarbon trap material comprises substantially no Cu, Co, Mn, Ag, In, Ir, and/or Rh.

14. The nitrogen oxide storage catalyst according to claim 1, wherein the substrate is a monolith.

15. A treatment system for an automobile exhaust gas stream comprising
a combustion engine,
an exhaust gas conduit in fluid communication with the engine, and
a nitrogen oxide storage catalyst according to claim 1 provided within the exhaust gas conduit.

16. A method for the treatment of automobile engine exhaust gas comprising:
(i) providing a nitrogen oxide storage catalyst according to claim 1, and (ii) conducting an automobile engine exhaust gas stream over and/or through the nitrogen oxide storage catalyst.

17. The method according to claim 16, wherein the automobile engine exhaust gas stream is from a lean burn combustion engine.

* * * * *